United States Patent [19]
Mitchell et al.

[11] Patent Number: 5,824,120
[45] Date of Patent: Oct. 20, 1998

[54] ELECTRICALLY CONDUCTIVE ADHESION PROMOTERS FOR CURRENT COLLECTORS

[75] Inventors: Porter H. Mitchell, Las Vegas; M. Yazid Saidi, Henderson, both of Nev.

[73] Assignee: Valence Technology, Inc., Henderson, Nev.

[21] Appl. No.: 634,752

[22] Filed: Apr. 10, 1996

[51] Int. Cl.⁶ .................................................... H01M 4/60
[52] U.S. Cl. ....................... 29/623.1; 29/623.4; 429/233; 429/234; 429/245
[58] Field of Search ................................. 429/212, 234, 429/245, 217, 233, 162; 29/623.4, 2, 623.5, 142

[56] References Cited

U.S. PATENT DOCUMENTS

| | | | |
|---|---|---|---|
| 4,477,544 | 10/1984 | Bruder | 429/160 |
| 5,019,467 | 5/1991 | Fujiwara | 429/127 |
| 5,399,447 | 3/1995 | Chaloner, Jr. et al. | 429/191 |
| 5,441,830 | 8/1995 | Moulton et al. | 429/212 |
| 5,464,707 | 11/1995 | Moulton et al. | 429/212 |
| 5,542,163 | 8/1996 | Chang | 29/2 |

*Primary Examiner*—M. Nuzzolillo
*Attorney, Agent, or Firm*—Charles Jew

[57] ABSTRACT

A method of preparing an electrochemical cell wherein the composite electrode material adheres to the metal current collector to create good electrical contact is provided. The electrode/current collector comprises a current collector, a layer of an electrically conductive adhesion promoter formed on at least one surface of the current collector which comprises an electrically conductive material and an adhesive polymer; and a composite electrode selected from the group consisting of composite cathode and composite anode, wherein the thickness of said electrically conductive adhesive promoter is sufficient to bind the composite electrode to said current collector.

26 Claims, 1 Drawing Sheet

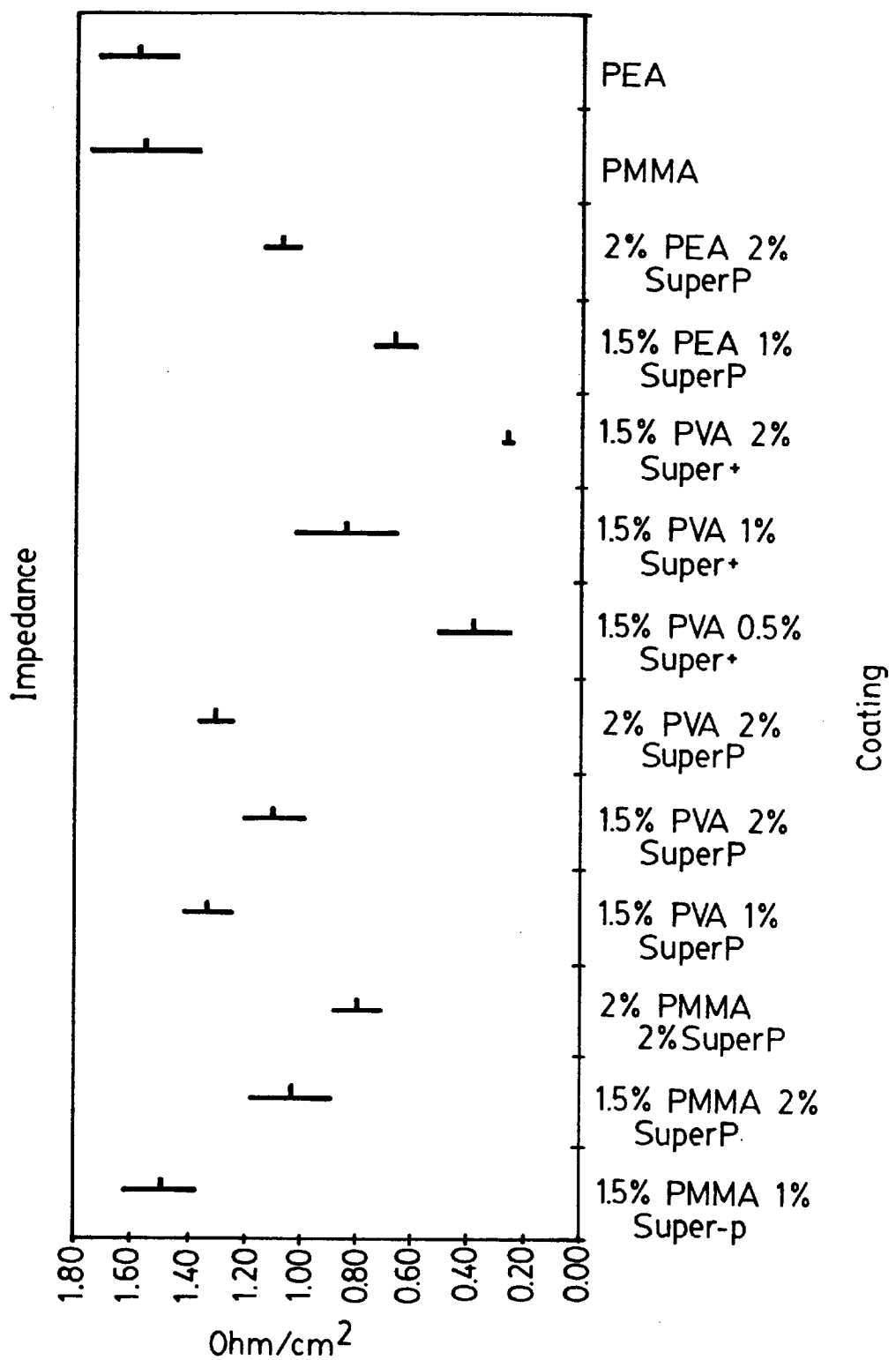

ELECTRICALLY CONDUCTIVE ADHESION PROMOTERS FOR CURRENT COLLECTORS

FIELD OF THE INVENTION

The present invention relates to electrochemical devices and, more particularly, to non-aqueous electrochemical cells demonstrating improved performance.

BACKGROUND OF THE INVENTION

Electrochemical cells comprise a cathode, an anode and an electrolyte interposed therebetween. The electrochemical cells are often defined as liquid or solid cells and this refers merely to whether the electrolyte interposed between the anode and the cathode is a liquid or a solid. Solid electrochemical cells are well known in the art and present many advantages over conventional liquid batteries such as improved safety features, lighter weight, etc. Non-aqueous lithium electrochemical cells are discussed in U.S. Pat. Nos. 4,472,487, 4,668,595, 5,028,500, and 5,441,830.

The anode is typically comprised of a compatible anodic material which is any material which functions as an anode in an electrochemical cell. Such compatible anodic materials are well known in the art and include, by way of example, lithium, lithium alloys, such as alloys of lithium with aluminum, mercury, nickel, zinc, and the like, and intercalation based anodes such as carbon, $WO_3$, and the like.

The cathode comprises a compatible cathodic material which refers to any material which functions as a positive pole (cathode) in an electrochemical cell. Such compatible cathodic materials are well known in the art and include, by way of example, manganese dioxide, molybdenum trioxide, sulfides of titanium and niobium, chromium oxide, copper oxide, vanadium oxides such as $V_2O_5$, $V_6O_{13}$, $LiV_3O_8$ and the like. The particular compatible cathodic material employed is not critical. When the electrochemical cell is a secondary cell, then the compatible cathodic material employed is one which is capable of being recharged (e.g., $LiV_3O_8$, $V_6O_{13}$, $MoO_3$, and the like).

The term "composite electrode" refers to cathodes and anodes wherein the cathode is comprised of materials other than compatible cathodic materials and the anode is comprised of materials other than compatible anodic materials. Typically, the composite electrode contains a polymer which acts to bind the composite materials together and an electrolytic solvent. Composite electrodes are well known in the art. For example, a composite cathode can comprise a compatible cathodic material, a conductive material, an electrolytic solvent, an alkali salt, and a solid matrix forming polymer. Similarly, for example, a composite anode can comprise a compatible intercalation anodic material, an electrolytic solvent and a solid matrix forming polymer.

In order to enhance the overall current produced by solid or liquid batteries, it is conventional to employ several electrochemical cells in a battery. When so employed, the current from each of the cells is accumulated so that the total current generated by the battery is roughly the sum of the current generated from each of the individual electrochemical cells employed in the battery. One method for accumulating the current from individual electrochemical cells is by using a current collector attached to the cathode or the anode of the electrochemical cell. Typically, the current collector is a metal foil or a conductive plastic which is coupled to other current collectors in the battery so that the current generated by each cell is collected and accumulated over all of the cells. Thus, the total current generated by the battery is a summation of the current generated by each of the electrochemical cells employed in the battery minus whatever current is lost due to resistance in the current collector. Current collectors are described, for example, in U.S. Pat. Nos. 4,925,752, 5,011,501 and 5,441,830. Notwithstanding the benefits of using current collectors in electrochemical cells, metal foil current collectors often do not adhere to the surface of composite electrodes. This inevitably reduces the electrochemical performance of the electrochemical cell and battery. U.S. Pat. No. 5,464,707 describes the use of an adhesion promoting layer that is applied onto the surface of a current collector. Thereafter, a cathode paste comprising monomers and/or prepolymers is coated onto the adhesion layer. Upon curing the monomers and/or prepolymers of the cathode paste, the cathode material becomes attached to the collector.

This invention is directed to the discovery that the inclusion of a layer of electrically-conducting adhesion-promoter to the surface of the metal current collector provides a means to improve the adherence of the composite electrode to the metal current collector.

SUMMARY OF THE INVENTION

The present invention is based in part on the discovery that improved adhesion of composite electrodes to metal current collectors can be achieved by employing an electrically conductive adhesion promoter. The invention lowers the impedance of the electrochemical cells and batteries.

In one aspect, the invention is directed to an electrode/current collector that comprises:
  a current collector,
  a layer of an electrically conductive adhesion promoter formed on at least one surface of the current collector which comprises an electrically conductive material and an adhesive polymer; and
  a composite electrode selected from the group consisting of composite cathode and composite anode, wherein the thickness of said electrically conductive adhesive promoter is sufficient to bind the composite electrode to said current collector.

In another aspect, the invention is directed to an electrochemical cell that comprises:
  a composite cathode and a cathode current collector having a first layer of an electrically conductive adhesion promoter comprising a first conductive material and a first polymer on at least one surface of the cathode current collector that is positioned between the composite cathode and the cathode current collector;
  a composite anode and an anode current collector having a second layer of an electrically conductive adhesion promoter comprising a second conductive material and a second polymer on at least one surface of the anode current collector that is positioned between the composite anode and the anode current collector; and
  an electrolyte containing an electrolyte solvent and a salt that is interposed between the composite cathode and the composite anode.

In a further aspect, the invention is directed to a method of fabricating an electrochemical cell which comprises the steps of:
  (a) selecting a cathode current collector;
  (b) applying a first layer of an electrically conductive adhesion promoter onto a surface of said cathode current collector;
  (c) forming a composite cathode on said first layer;

(d) selecting an anode current collector;

(e) applying a second layer of an electrically conductive adhesion promoter onto a surface of said anode current collector;

(f) forming a composite anode on said second layer; and (g) interposing an electrolyte containing an electrolyte solvent and salt between the composite anode and composite cathode.

BRIEF DESCRIPTION OF THE DRAWINGS

FIG. 1 shows the measured impedance for various the electrochemical cells employing different adhesion layers.

DETAILED DESCRIPTION OF THE PREFERRED EMBODIMENTS OF THE INVENTION

The present invention is directed to a method of preparing current collectors and composite electrodes suitable for use in electrochemical devices particularly in electrochemical cell and batteries.

Preferred electrochemical cells include: a composite cathode comprising an active material and a polymeric binder, a composite anode comprising an intercalation based carbon anode, with each electrode capable of reversibly incorporating (e.g., intercalating) an alkali metal ion, and a polymeric matrix containing an electrolyte solution comprising an organic electrolyte solvent and a salt of the alkali metal. At least one of the composite electrodes has a current collector that is coated with a layer of an electrically conductive adhesion promoter that is positioned between the composite electrode and current collector. Preferably both composite electrodes are so constructed. The electrically conductive adhesion promoter layer significantly improves the adhesion of the current collector to the composite electrode which results in a reduction in the impedance for the electrochemical cell and battery. Particularly preferred electrochemical cells and batteries use lithium and salts thereof. Although solid electrochemical cells are preferred, the invention is also applicable to liquid electrochemical cells wherein the electrolyte comprises a separator (e.g., glass fiber, polyethylene or polypropylene) and an electrolyte solution.

The anode of the present invention generally comprises an anode film that is laminated onto one or both sides of the current collector. Typically, each anode film is from about 100 $\mu$m to about 250 $\mu$m in thickness, preferably about 110 $\mu$m to about 200 $\mu$m, and more preferably about 125 $\mu$m to about 175 $\mu$m Similarly, the cathode of the present invention generally comprises a cathode film that is laminated onto one or both sides of the current collector. Typically, each cathode film is from about 100 $\mu$m to about 200 $\mu$m in thickness, preferably about 130 $\mu$m to about 175 $\mu$m, and more preferably about 140 $\mu$m to about 165 $\mu$m.

The current collectors comprise, for example, a screen, grid, expanded metal, foil, woven or non-woven fabric or knitted wire formed from an electron conductive material such as metals or alloys. Preferably, the current collector has a thickness from about 25 $\mu$m to about 75 $\mu$m, preferably about 35 $\mu$m to about 65 $\mu$m, and more preferably about 45 $\mu$m to about 55 $\mu$m. Each current collector is also connected to a current collector tab which extends from the edge of the current collector. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

A critical feature of the invention is that the current collector is coated with a layer of electrically conductive adhesion promoter which is a composition that comprises an adhesion polymer and an electrically conductive material. The adhesion polymer serves to adhere the current collector surface to the composite electrode. Preferred adhesion polymers include, for example, (1) acrylics including acrylic and methacrylic acids and esters, (2) vinyls including poly(vinyl acetate), (3) polyesters, (4) polyurethanes, (5) fluoroelastomers, and mixtures thereof. A preferred polyester is poly(adipic acid-co-ethylene glycol); a preferred polyurethane is poly(poly(oxypropylene)-co-toluene diisocyanate and a preferred fluoroelastomer comprise a two part adhesive of poly(vinylidene fluoride-co-hexafluoropropylene) and ketenes. Preferably, the adhesion polymer has a molecular weight of at least about 10,000.

Preferred electrically conductive materials include, for example, conductive carbons including graphite powders and hollow carbon fibers, ultrafine metal powders which preferably have diameters of about 15 $\mu$m or less, preferably from about 5 $\mu$m to about 30 $\mu$m, highly conjugated polymers such as BLACK ORLON which is produced by simultaneous cyclization and oxidation of at 160°–300° C. of polyacrylonitrile, and polyacetylene, metal coated carbon fibers, metal coated polymeric fibers, indium tin oxide, buckminister fullverenes, and mixtures thereof. Preferred conjugated polymers also include, for example, poly (thiophene) and poly(diacetylenes).

The relative amounts of adhesion polymer and electrically conductive material in the adhesion layer are selected to achieve adequate adhesion of the current collector of the composite electrode and sufficient electrical conductivity. Preferably, the percentage of electrically conductive materials present ranges from about 10% to about 80%; more preferably from about 50% to about 60%, on a weight basis. Similarly, the thickness of the electrically conductive adhesion promoter layer is selected to achieve adequate adhesion of the current collector of the composite electrode and sufficient electrical conductivity. Preferably the coat weight of this layer is from about $4\times10^{-5}$ g/cm$^2$ to about $4\times10^{-3}$ g/cm$^2$; more preferably from about $1\times10^{-4}$ g/cm$^2$ to about $1\times10^{-3}$ g/cm$^2$; most preferably from about $1\times10^{-4}$ g/cm$^2$ to about $6\times10^{-4}$ g/cm$^2$.

The choice of adhesion polymer(s) and electrically conductive material(s) will depend, in part, the other components employed in fabricating the composite electrode and electrolyte. For example, these materials must be compatible with the extraction solvent used to remove the plasticizer. In particular, adhesion polymer should be essentially insoluble in the organic extraction solvents.

The layer of adhesion promoter is prepared by first forming a mixture comprising a solvent, the adhesion polymer, and the electrically conductive material. The solvent employed dissolves the polymer so that polymer is substantially uniformly distributed on the surface of the current collector upon coating thereon. Suitable solvents include, for example, ethyl acetate, acetone, water, alcohols, and hydrocarbons. The current collector can be coated by conventional methods such as by spin coating, dipping, or painting. Once the surface is coated, the solvent is removed by evaporation, for instance, to leave an adhesion promotion layer that is attached to the surface of the current collector.

However, prior to describing this invention in further detail, the following terms will be defined.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability by dense gases. Preferred plasticizers include, for example, dibutyl phthalate, dioctylphthalate, and acetates, glymes, and low molecular weight polymers.

In operation, for fabricating a solid polymeric matrix and composite electrode that includes polymeric binders, for example, the plasticizer is first well mixed with a polymer. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and solid polymeric matrix. The anode and/or cathode may each include a current collector. For a liquid electrolytic cell, a separator made of any suitable material such as, for example, glass fiber, polyethylene, or polypropylene is employed instead of a solid polymeric matrix.

The term "activation" refers to the placement of an inorganic salt and electrolyte solvent into the porous portions of an electrochemical cell precursor. After activation, the electrochemical cell is charged by an external energy source prior to use.

The term "electrolytic cell" or "electrochemical cell" refers to a composite containing an anode, a cathode and an ion-conducting electrolyte interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499, 4,388,385, 4,414,607, 4,394,280, 4,432,891, 4,539,276, and 4,557,985 each of which is incorporated herein by reference.

The term "a solid matrix forming monomer" refers to inorganic or organic materials which in monomeric form can be polymerized, preferably in the presence of an inorganic ion salt, and a solvent mixture of an organic carbonate and a glyme compound, to form solid matrices which are suitable for use as solid electrolytes in electrolytic cells. Suitable solid matrix forming monomers are well known in the art and the particular monomer employed is not critical. The solid matrix forming monomers may also comprise heteroatoms capable of forming donor acceptor bonds with inorganic cations (e.g., alkali ions).

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253, which patent is incorporated herein by reference in its entirety), and the like as well as mixtures thereof. Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonate(s) to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of polyvinylidene difluroide and hexafluoropropylene dissolved in acetone or other suitable solvent. Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The electrolyte typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate. For electrochemical cells where the cathode comprises vanadium oxides, e.g., $V_6O_{13}$ and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The composite anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), EAA (ethylene acrylic acid copolymer), EVA (ethylene vinyl acetate copolymer), EAA/EVA copolymers, and the like. Composite anodes of the present invention preferably comprise a carbon material and a polymeric binder which preferably includes, for example, polymers such as polyvinylidene difluoride, halogenated hydrocarbon polymers including, for example, poly(vinylidene chloride), poly( (dichloro-1,4-phenylen) ethylene), fluorinated urethanes, fluorinated epoxides, fluorinated acrylics, and copolymers thereof.

The composite cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$ and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq2$. Blends can also include $Li_y$-$\alpha$-$MnO_2$ ($0\leq y<1$) which is $Li_yNH_4Mn_8O_{16}$ ($0\leq y<1$) which has a hollandite-type structure. $Li_y$-$\alpha$-$MnO_2$ where $0\leq y<0.5$ is preferred. $\alpha MnO_2$ can be synthesized by precipitation from a reaction between a $MnSO_4$ solution and $(NH_4)_2S_2O_8$ as an oxidizing agent.

Lithiation (also referred to as "prelithiation) of $\alpha MnO_2$ can be accomplished via a solid state reaction:

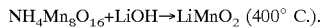

$NH_4Mn_8O_{16}+LiOH \rightarrow LiMnO_2$ (400° C.).

Li-$\alpha$-$MnO_2$ retains the same structure as Hollandite. See, Botkovitz et. al., J. of Power Sources, 43–44 (1993) 657–665, which is incorporated herein, for a discussion of the structure and electrochemical characteristics of Li-$\alpha$-$MnO_2$. $Li_y$-$\alpha$-$MnO_2$ $0\leq y<0.5$ is commercially available from SEDEMA, Tertre, Belgium.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000.

In one preferred embodiment, the composite cathode is prepared from a cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like; from about 0 to about 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a solid matrix forming monomer or partial polymer thereof. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent (e.g., organic carbonate/glyme mixture) based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

METHODOLOGY

Electrochemical cells are known in the art. See, for example, U.S. Pat. Nos. 5,300,373, 5,316,556, 5,346,385, 5,262,253, 4,472,487, 4,668,595, and 5,028,500, all of which are incorporated herein. The inventive method can be adapted to modify current collectors suitable for prior art electrochemical cells. A critical feature of the present invention is that the polymeric binder (e.g., copolymer of PVDF and HFP) of the composite electrode can be formed prior to being laminated onto the surface of the coated current collector. With the present invention, the monomers and/or prepolymers of the composite electrodes need not be cured (i.e., polymerized) after the electrode slurry has been applied onto the current collector. Rather, polymerization can occur before so that upon removal of the solvent from the anode or cathode slurry after being applied to the current collector the composite electrode is formed with no further curing (i.e., polymerization) required.

The following Examples illustrate methods of how an electrolytic cell could be fabricated with the inventive process. Examples 1 and 2 describe the process of preparing the anode and cathodes, respectively. Example 3 describes the procedures for fabricating a solid electrolytic cell.

The electrically conductive adhesion promoters for the current collectors (e.g., grids) were prepared as follows: a conductive carbon slurry was prepared separately by first adding 6 grams of conductive carbon black into 289.5 grams of ethyl acetate. The mixture was dispersed using an Eiger media-mill, using a 2 mm diameter media, rotating at 1500±200 RPM, for 10 to 30 minutes. The temperature in the Eiger mill was maintained at 21° C.±1° C. using a Nestlab refrigerated circulating bath. After the dispersion mixing the slurry was transferred to a ball mill jar and 4.5 grams of polymer was added. This mixture was ball milled for 12 hours. Cleaned and etched grids are dipped in the slurry and allowed to air dry. Average coat weight was about 0.004 grams. Alternatively, an airless sprayer can be used to spray the slurry on the grid.

The invention will be described using the anode and cathode structures wherein electrode materials (or films) are laminated onto both sides of the current collectors, however, it is understood that the invention is applicable to other configurations, for example, where only one side of the anode and/or cathode current collector is laminated.

EXAMPLE 1

The anode current collector employed was a sheet of expanded copper metal that is about 50 $\mu$m thick. It is available under the designation Delker #2 Cu5-125 (flatten) Delker Corp., Branford, Conn. Both surfaces of the anode current collector are coated with an electrically conductive adhesion promoter layer.

The anode slurry was prepared as follows:

A polymer mixture comprising a copolymer of polyvinylidene difluoride (PVDF) and hexafluoropropylene (HFP) was prepared by mixing 23.3 grams of the copolymer in 100 ml of acetone. The copolymer (ave. melt viscosity 23,000–27,000 poise) was Kynar Flex 2801™ from Elf Atochen North America, Philadelphia, Pa. The mixture was stirred for about 24 hours in a milling jar available from VWR Scientific, San Francisco, Calif., catalogue No. H-04172-00. The copolymer functions as a binder for the carbon in the anode.

A graphite mixture was prepared separately by first adding 80 grams of graphite into 3.1 grams of carbon black into a solution containing 200 grams acetone, 36 grams dibutyl phthalate, and 0.5 grams of a surfactant. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M.M.M. Carbon, Willbroeck, Belgium. Preferred surfactants include pluronic FC68™ from BASF, Mt. Olive, N.J. and Fluorad 430™ from 3M Co. St. Paul, Minn. The surfactant disperses the graphite. The graphite mixture was then vigorously mixed in a high shear mixer until a substantially homogeneous blend was formed. A suitable mixer is available from Ross, Model ME100DLX, Hauppauge, N.Y. operating at a high setting (about 10,000 RPM) for 30 minutes.

The anode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Anode films form when the remaining portion of the acetone evaporates.

EXAMPLE 2

The cathode current collector employed was a sheet of expanded aluminum that is about 50 $\mu$m thick. The aluminum grid is available under the designation 2AL5-077 from Delker Corp. Both surfaces of the cathode current collector are coated with an electrically conductive adhesion promoter.

The cathode slurry was prepared as follows:

A polymer mixture comprising a copolymer of polyvinylidene difluoride (PVDF) and hexafluoropropylene (HFP) was prepared by mixing 26.7 grams of the copolymer in 100 grams of acetone. The copolymer was Kynar Flex 2801™. The mixture was stirred for about 24 hours in a milling jar.

An active material mixture was prepared separately by first adding 173.4 grams of a cathode-active material blend of $Li_xMn_2O_4$ (spinel) ($0<x\leq2$) and $Li_y$-$\alpha$-$MnO_2$ ($0\leq y<1$) (1:1 weight ratio), 14.7 grams of carbon black (Super P™) into a solution containing 333.3 grams acetone, 51.9 grams dibutyl phthalate, and 0.9 grams of a surfactant. The mixture was then vigorously mixed in the a high shear mixer until a substantially homogeneous blend was formed.

The cathode slurry was prepared by mixing the polymer mixture and the $Li_xMn_2O_4$ mixture together under low shear conditions to form the anode slurry wherein the components are well mixed. A portion of the acetone is allowed to evaporate from the slurry before it was laminated onto each side of the current collector. Cathode films form when the remaining portion of the acetone evaporates.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

EXAMPLE 3

A solid electrochemical cell is prepared by first positioning a polymeric matrix between the anode and cathode and thereafter fusing the structures under moderate pressure and temperature (e.g., 130° C.) to form an electrochemical cell precursor. The polymeric matrix is formed by casting a polymeric slurry comprising acetone, dibutyl phthalate, silanized fumed $SiO_2$, and the PVDF/HFP copolymer on a suitable substrate or carrier web and allowing the acetone to evaporate. No curing by radiation is required. The $SiO_2$ is a filler which impart toughness and strength to the film. In addition, it is believed that the $SiO_2$ assists the activation process by creating phyico-chemical conditions such that the electrolyte solution quickly and completely fills the pores created by the extraction of the dibutyl phthalate. Preferably, the polymeric slurry is mixed under low shear conditions as not to degrade the copolymer. The precursor is then packaged in moisture-impermeable material which is described, for example, in U.S. Pat. No. 5,326,653 which is incorporated herein.

In the process of preparing the polymer mixtures for both the anode and cathode slurries it is preferred that the polymer (or copolymer) not be subject to high shear so as to be degraded. It is believed that polymer degradation contributes to the creation of the polymer concentration gradient in the electrode film. Furthermore, preferably the polymer or copolymer employed has a high average molecular weight. Preferably the average molecular weight is between 50K to 750K, more preferably 200K to 500K, and most preferably 250K to 300K. Furthermore, it is preferred that polymer or copolymer has a narrow molecular weight range. Preferably $M_n/M_w \cong 1.0$.

Next, the dibutyl phthalate plasticizer is extracted from the precursor before being activated. Extraction can be accomplished using conventional organic liquid solvents such as diethyl ether or by a dense fluid or gas which refers to a gas compressed and heated to either supercritical or subcritical conditions to achieve liquid-like densities. Dense gases and fluids are known in the art. See, for example, U.S. Pat. Nos. 5,013,366, 5,267,455, 4,219,333, 4,012,194, and 3,969,196, which are incorporated herein. A preferred dense gas is carbon dioxide. Following extraction, the precursor is first pre-packaged in moisture impermeable material described, for example, in U.S. Pat. No. 5,326,653 which is incorporated herein and then activated. Activation preferably takes place in an inert (e.g., argon) atmosphere. Finally, the packaging is sealed and the electrochemical cell is ready for use.

EXPERIMENTAL

Electrochemical cells fabricated generally in accordance Examples 1–3 were employed to test different adhesion promoter compositions. Specifically, 13 different adhesion compositions were prepared and coated on both sides of the anode and cathode grid current collectors. Each composition was prepared by mixing an adhesive polymer and, in most cases, an electrically conductive material in ethyl acetate as described above. The solvent mixture was the dip coated onto the grids and then allowed to air dry. All of the grids with the adhesion layer remained attached to the composite electrodes (both anodes and cathodes). The components in the 13 compositions are listed in Table 1 as the weight percentage present in the solvent mixture.

TABLE 1

Components % in mixture

| Composition | PMMA | PVA | PEA | SUPER P | SUPER P+ |
|---|---|---|---|---|---|
| 1.(9)* | 1.5 | | | 1 | |
| 2.(13) | 1.5 | | | 2 | |
| 3.(9) | 2 | | | 2 | |
| 4.(18) | | 1.5 | | 1 | |
| 5.(17) | | 1.5 | | 2 | |
| 6.(9) | | 2 | | 2 | |
| 7.(9) | | 1.5 | | | 0.5 |
| 8.(9) | | 1.5 | | | 1 |
| 9.(11) | | 1.5 | | | 2 |
| 10.(18) | | | 1.5 | 1 | |
| 11.(17) | | | 2 | 2 | |
| 12.(5) | 1.5 | | | | |
| 13.(5) | 1.5 | | | | |

*The number in parenthesis is the number of cells tested having the particular adhesion promoter composition.

PMMA is poly (methyl methacrylate); PVA is poly (vinyl acetate); and PEA is poly (ethyl acetate).

SUPER P and SUPER+ are carbon blacks available from M.M.M. Carbon, Willebroek, Belgium.

Electrochemical cells fabricated by the inventive process have demonstrated superior performance including, for example, low impedance, minimum first cycle loss, high second cycle capacity, and high capacity retention. FIG. 1 shows the results of AC impedance measurements made for each of the cells having the 13 adhesion compositions listed in Table 1. The graph depicts the high, low, and mean values of the measurements. As is apparent, cells having adhesion compositions comprising electrically conductive materials have overall impedances of less than about 1.5 ohm/cm$^2$ and preferably less than about 0.25 ohm/cm$^2$. The anode, cathode, and solid electrolyte of the electrochemical cells each has a surface area of approximately 48 cm$^2$.

The exceptionally low impedance achieved by the cells is believed to be attributable to the strong bond or attachment between the current collector and composite electrode.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A method of preparing an electrode/current collector that comprises the steps of:
    providing a metal current collector,
    forming a layer of an electrically conductive adhesion promoter formed on at least one surface of the metal current collector which comprises an electrically conductive material and an adhesive polymer;
    applying a mixture comprising a solvent, a polymeric binder, and an anodic material or cathodic material onto the layer of electrically conductive adhesion promoter wherein the polymeric binder is a polymer that is derived by polymerizing monomers or prepolymers; and
    removing said solvent from the mixture to form a composite electrode that is attached to said layer of electrically conductive adhesion promoter, wherein the composite electrode is selected from the group consisting of a composite cathode and a composite anode, wherein the thickness of said electrically conductive adhesive promoter is sufficient to bind the composite electrode to said metal current collector and wherein no curing to polymerize the polymeric binder is required subsequent to applying the mixture onto the layer of electrically conductive adhesion promoter.

2. The method according to claim 1 wherein said composite electrode is a composite cathode.

3. The method according to claim 1 wherein said composite electrode is a composite anode.

4. The method according to claim 2 wherein the impedance across the electrode/current collector is less than about 1.5 ohm/cm$^2$.

5. The method according to claim 3 wherein the impedance across the electrode/current collector is less than about 1.5 ohm/cm$^2$.

6. The method according to claim 1 wherein said electrically conductive material is selected from the group consisting of carbon powder, graphite and mixtures thereof.

7. The method according to claim 1 wherein said adhesive electrically conductive adhesion promoter comprises from about 50 to about 60 weight percent of said electrically conductive material.

8. The method according to claim 1 wherein said adhesive polymer is selected from the group consisting of (1) acrylics including acrylic and methacrylic acids and esters, (2) vinyls including poly(vinyl acetate), (3) polyesters, (4) polyurethanes, (5) fluoroelastomers, and mixtures thereof.

9. The method according to claim 8 wherein said adhesive polymer has a molecular weight of at least about 10,000.

10. The method according to claim 1 wherein said polymeric binder is a copolymer of vinylidene difluoride and hexafluoropropylene.

11. A method of fabricating an electrochemical cell that comprises the steps of:
    (a) forming a cathode by a process comprising:
        (i) providing a metal current collector,
        (ii) forming a layer of an electrically conductive adhesion promoter formed on at least one surface of the metal current collector which comprises an electrically conductive material and an adhesive polymer;
        (iii) applying a mixture comprising a solvent, a polymeric binder, and a cathodic material onto the layer of electrically conductive adhesion promoter wherein the polymeric binder is a polymer that is derived by polymerizing monomers or prepolymers; and
        (iv) removing said solvent from the mixture to form a composite cathode that is attached to said layer of electrically conductive adhesion promoter, wherein the thickness of said electrically conductive adhesive promoter is sufficient to bind the composite cathode to said metal current collector, and wherein no curing to polymerize the polymeric binder is required subsequent to applying the mixture onto the layer of electrically conductive adhesion promoter;

(b) providing an anode; and (c) positioning an electrolyte matrix containing an electrolyte solvent and a salt that is interposed between the composite cathode and the anode.

12. The method according to claim 11 wherein the anode is fabricated by a process comprising the steps of:

providing a second metal current collector, forming a second layer of an electrically conductive adhesion promoter formed on at least one surface of the second metal current collector which comprises a second electrically conductive material and a second adhesive polymer;

applying a second mixture comprising a second solvent, a second polymeric binder, and an anodic material onto the second layer of electrically conductive adhesion promoter wherein the second polymeric binder is derived by polymerizing monomers or prepolymers; and removing said solvent from the second mixture to form a composite anode that is attached to said second layer of electrically conductive adhesion promoter, wherein the thickness of said second electrically conductive adhesive promoter layer is sufficient to bind the composite anode to said second metal current collector, and wherein no curing to polymerize the second polymeric binder is required subsequent to applying the second mixture onto the second layer of electrically conductive adhesion promoter.

13. The method according to claim 11 wherein said conductive material is selected from the group consisting of carbon powder, graphite, and mixtures thereof.

14. The method according to claim 11 wherein said electrically conductive adhesion promoter comprises from about 50 to about 60 weight percent of the electrically conductive material.

15. The method according to claim 11 wherein said adhesive polymer is selected from the group consisting of (1) acrylics including acrylic and methacrylic acids and esters, (2) vinyls including poly(vinyl acetate), (3) polyesters, (4) polyurethanes, (5) fluoroelastomers, and mixtures thereof.

16. The method according to claim 11 wherein said adhesive polymer has a molecular weight of at least about 10,000.

17. The method according to claim 11 wherein the impedance of the electrochemical cell is less than about 1.5 ohm/cm$^2$.

18. An electrochemical cell fabricated by the process defined in claim 11.

19. The electrochemical cell according claim 18 wherein the anode is fabricated by a process comprising the steps of:

providing a second metal current collector, forming a second layer of an electrically conductive adhesion promoter formed on at least one surface of the second metal current collector which comprises a second electrically conductive material and a second adhesive polymer;

applying a second mixture comprising a second solvent, a second polymeric binder, and an anodic material onto the second layer of electrically conductive adhesion promoter wherein the second polymeric binder is derived by polymerizing monomers or polymers; and removing said solvent from the second mixture to form a composite anode that is attached to said second layer of electrically conductive adhesion promoter, wherein the thickness of said second electrically conductive adhesive promoter layer is sufficient to bind the composite anode to said second metal current collector, and wherein no curing to polymerize the second polymeric binder is required subsequent to applying the second mixture onto the second layer of electrically conductive adhesion promoter.

20. The electrochemical cell according to claim 18 wherein the impedance of the electrochemical cell is less than about 1.5 ohm/cm$^2$.

21. The method according to claim 11 wherein said polymeric binder is selected from the group consisting of ethylene propylene diene termonomer, polyvinylidene difluoride, ethylene acrylic acid (EAA) copolymer, ethylene vinyl acetate (EVA) copolymer, and EAA/EVA copolymers.

22. The method according to claim 12 wherein the second polymeric binder is selected from the group consisting of ethylene propylene diene termonomer, polyvinylidene difluoride, ethylene acrylic acid (EAA) copolymer, ethylene vinyl acetate (EVA) copolymer, and EAA/EVA copolymers.

23. The method according to claim 12 wherein the second polymeric binder is selected from the group consisting of polyvinylidene difluoride and halogenated hydrocarbon polymers which are selected from the group consisting of poly(vinylidene chloride), poly((dichloro-1,4-phenylen) ethylene), fluorinated urethanes, fluorinated epoxies, fluorinated acrylics, and copolymers thereof.

24. The electrochemical cell according to claim 18 wherein said polymeric binder is selected from the group consisting of ethylene propylene diene termonomer, polyvinylidene difluoride, ethylene acrylic acid (EAA) copolymer, ethylene vinyl acetate (EVA) copolymer, and EAA/EVA copolymers.

25. The electrochemical cell according to claim 19 wherein said second polymeric binder is selected from the group consisting of ethylene propylene diene termonomer, polyvinylidene difluoride, ethylene acrylic acid (EAA) copolymer, ethylene vinyl acetate (EVA) copolymer, and EAA/EVA copolymers.

26. The electrochemical cell according to claim 19 wherein said second polymeric binder is selected from the group consisting of polyvinylidene difluoride and halogenated hydrocarbon polymers which are selected from the group consisting of poly(vinylidene chloride), poly( (dichloro-1,4-phenylen) ethylene), fluorinated urethanes, fluorinated epoxies, fluorinated acrylics, and copolymers thereof.

* * * * *